US012000116B2

(12) United States Patent
Sugimura et al.

(10) Patent No.: US 12,000,116 B2
(45) Date of Patent: Jun. 4, 2024

(54) WORK MACHINE DISPLAY SYSTEM AND WORK MACHINE DISPLAY METHOD

(71) Applicant: KOMATSU LTD., Tokyo (JP)

(72) Inventors: Shunsuke Sugimura, Tokyo (JP); Takehiro Shibata, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/633,748

(22) PCT Filed: Sep. 11, 2020

(86) PCT No.: PCT/JP2020/034466
§ 371 (c)(1),
(2) Date: Feb. 8, 2022

(87) PCT Pub. No.: WO2021/049614
PCT Pub. Date: Mar. 18, 2021

(65) Prior Publication Data
US 2022/0325503 A1   Oct. 13, 2022

(30) Foreign Application Priority Data
Sep. 13, 2019  (JP) .................... 2019-167454

(51) Int. Cl.
*E02F 9/26* (2006.01)
*B60R 1/23* (2022.01)
*H04N 7/18* (2006.01)

(52) U.S. Cl.
CPC .............. *E02F 9/261* (2013.01); *B60R 1/23* (2022.01); *H04N 7/183* (2013.01); *B60R 2300/302* (2013.01)

(58) Field of Classification Search
CPC ... E02F 9/261; E02F 9/24; E02F 9/267; E02F 9/26; B60R 1/23; B60R 2300/302;
(Continued)

(56) References Cited

U.S. PATENT DOCUMENTS

2014/0354813 A1   12/2014  Ishimoto
2017/0016210 A1   1/2017   Kowatari et al.
(Continued)

FOREIGN PATENT DOCUMENTS

JP   2012-46124 A   3/2012
JP   2015-76645 A   4/2015
(Continued)

OTHER PUBLICATIONS

The International Search Report for the corresponding international application No. PCT/JP2020/034466, dated Dec. 8, 2020.

*Primary Examiner* — Farzana Hossain
(74) *Attorney, Agent, or Firm* — Global IP Counselors, LLP

(57) ABSTRACT

A work machine display system includes an image acquisition unit and a display control unit. The image acquisition unit acquires a captured image in which surroundings of a work machine are portrayed. The display control unit generates a display signal in order to display a display image including a peripheral image based on the captured image on a screen of a display unit after transition when the display control unit receives a transition signal for screen transition while the peripheral image is displayed on the display unit.

17 Claims, 9 Drawing Sheets

(58) Field of Classification Search
CPC .... H04N 7/183; H04N 7/181; G06F 3/04817; G06F 3/0482; G06F 3/0484; G06F 3/04847

See application file for complete search history.

(56) References Cited

U.S. PATENT DOCUMENTS

| | | | |
|---|---|---|---|
| 2017/0305018 A1 | 10/2017 | Machida et al. | |
| 2019/0003155 A1* | 1/2019 | Kurogi | E02F 9/261 |
| 2019/0218754 A1* | 7/2019 | Izumikawa | E02F 9/261 |
| 2019/0317521 A1* | 10/2019 | Nishi | G05D 1/0287 |
| 2020/0291614 A1* | 9/2020 | Kiyota | E02F 9/24 |
| 2022/0002976 A1* | 1/2022 | Fukuoka | E02F 9/16 |

FOREIGN PATENT DOCUMENTS

| | | |
|---|---|---|
| JP | 2017-110472 A | 6/2017 |
| WO | 2013/038874 A1 | 3/2013 |
| WO | 2015/125979 A1 | 8/2015 |
| WO | 2016/013490 A1 | 1/2016 |
| WO | 2017/191853 A1 | 11/2017 |

* cited by examiner

WORK MACHINE DISPLAY SYSTEM AND WORK MACHINE DISPLAY METHOD

CROSS-REFERENCE TO RELATED APPLICATIONS

This application is a U.S. National stage application of International Application No. PCT/JP2020/034466, filed on Sep. 11, 2020. This U.S. National stage application claims priority under 35 U.S.C. § 119(a) to Japanese Patent Application No. 2019-167454, filed in Japan on Sep. 13, 2019, the entire contents of which are hereby incorporated herein by reference.

BACKGROUND

Field of the Invention

The present disclosure relates to a work machine display system and a work machine display method.

Background Information

International Publication No. 2017/191853 discloses a technique for enabling an operator to recognize visually a situation around a work machine during calibration of the work machine.

SUMMARY

According to International Publication No. 2017/191853, display data indicating a situation around the work machine is displayed on a display device, so that the operator can visually recognize the situation around the work machine during calibration work. The display device for the work machine can be switched to a screen such as a menu screen to display information related to a function of the work machine. However, the screen after switching to the screen displays the information related to the function on the entirety of the display device, and does not display the display data indicating a situation around the work machine. In a case where at least a part of the work machine is in an operable state, when the display device displays information related to a predetermined function, the operator may accidentally cause the work machine to operate.

An object of the present disclosure is to provide a work machine display system and a work machine display method that enable an operator to recognize visually a situation around a work machine.

According to a first aspect of the present invention, a work machine display system is provided, including: an image acquisition unit configured to acquire a captured image in which surroundings of a work machine are portrayed; and a display control unit configured to generate a display signal for displaying a display image including a peripheral image based on the captured image on a screen of a display unit after transition when the display control unit receives a transition signal for screen transition while the peripheral image is displayed on the display unit.

According to at least one of the above aspects, an operator can visually recognize a situation around the work machine.

DETAILED DESCRIPTION OF EMBODIMENT(S)

First Embodiment

Hereinafter, embodiments will be described in detail with reference to the drawings.

Configuration of Work Machine

Figure 1:
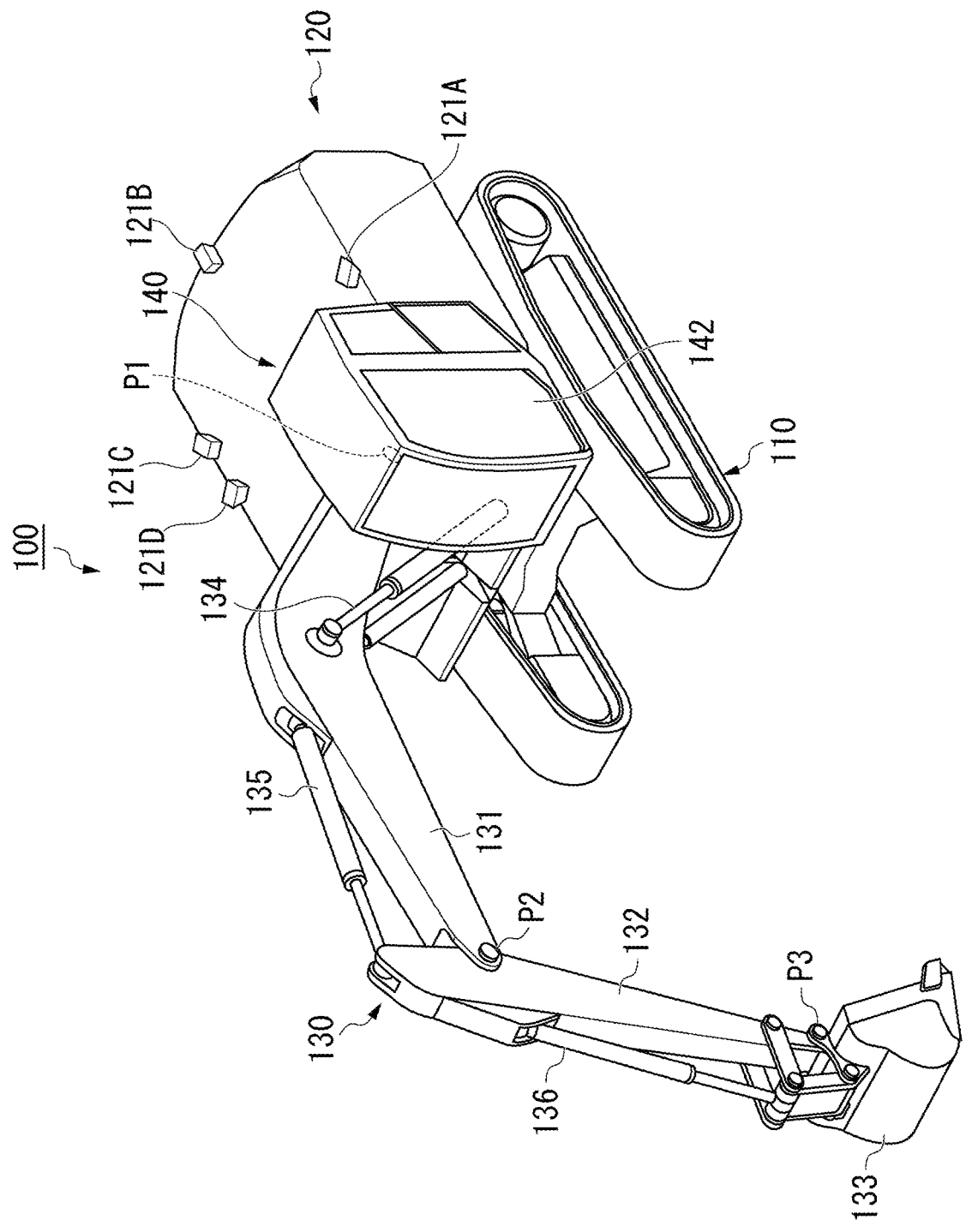
FIG. 1 is a schematic view showing a configuration of a work machine according to a first embodiment.

FIG. 1 is a schematic view showing a configuration of a work machine according to a first embodiment.

A work machine 100 operates at a construction site to construct a construction target such as earth. The work machine 100 according to the first embodiment is, for example, a hydraulic excavator. The work machine 100 includes an undercarriage 110, a swing body 120, work equipment 130, and a cab 140.

The undercarriage 110 supports the work machine 100 so as to capable of traveling. The undercarriage 110 is, for example, a pair of right and left endless tracks.

The swing body 120 is supported by the undercarriage 110 so as to be swingable around a swing center.

The work equipment 130 is driven by hydraulic pressure. The work equipment 130 is supported by a front portion of the swing body 120 so as to be drivable in an up to down direction. The cab 140 is a space on which an operator gets to operate the work machine 100. The cab 140 is provided on a left front portion of the swing body 120.

Here, a portion of the swing body 120 to which the work equipment 130 is attached is referred to as a front portion. In addition, in the swing body 120, a portion on an opposite side, a portion on a left side, and a portion on a right side with respect to the front portion are referred to as a rear portion, a left portion, and a right portion.

Configuration of Swing Body

Figure 2:
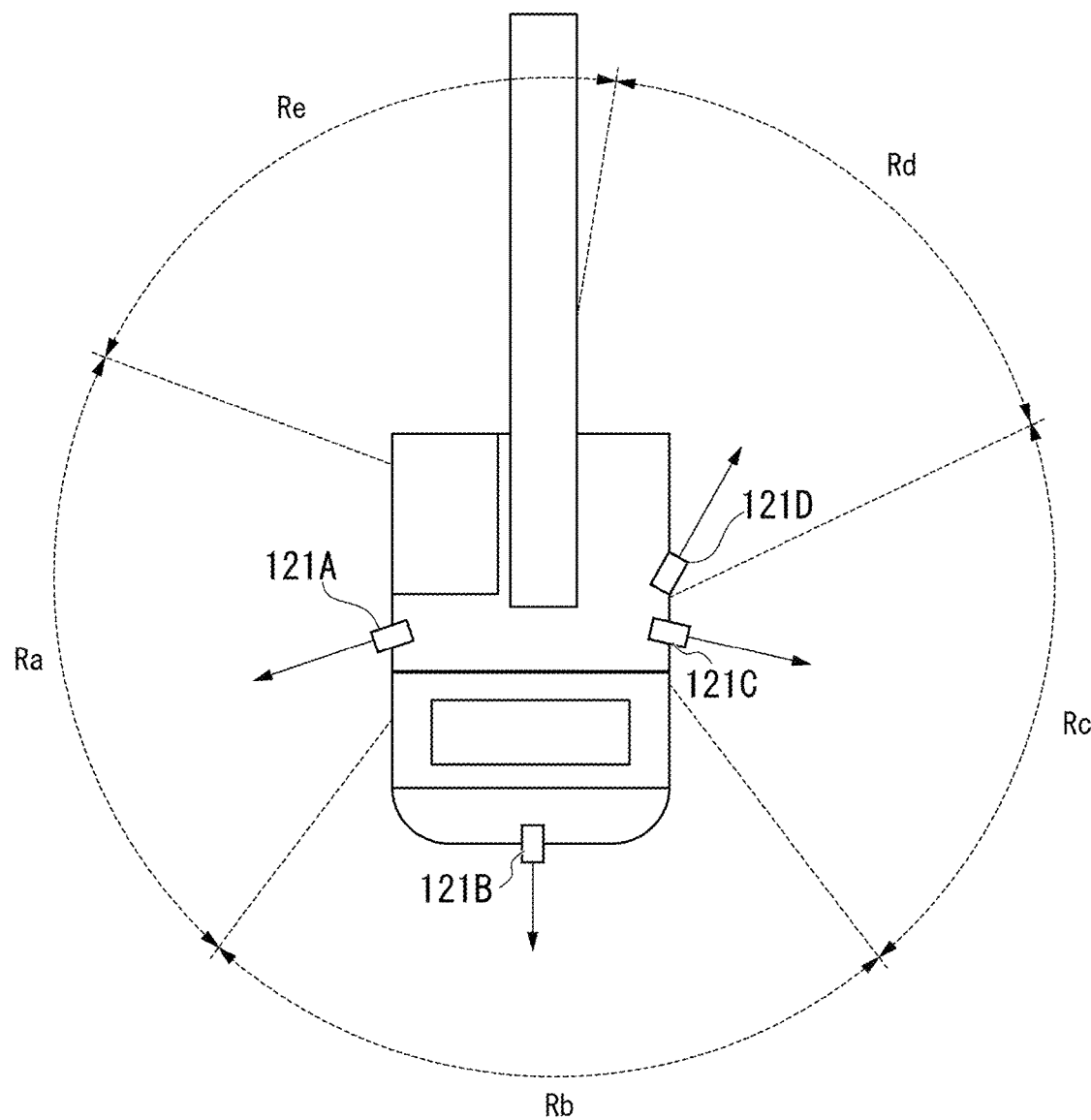
FIG. 2 is a view showing imaging ranges of a plurality of cameras provided in the work machine according to the first embodiment.

The swing body 120 is provided with a plurality of cameras 121 that capture images of surroundings of the work machine 100. FIG. 2 is a view showing imaging ranges of the plurality of cameras provided in the work machine according to the first embodiment.

Specifically, the swing body 120 is provided with a left rear camera 121A that captures an image of a left rear range Ra around the swing body 120, a rear camera 121B that captures an image of a rear range Rb around the swing body 120, a right rear camera 121C that captures an image of a right rear range Rc around the swing body 120, and a right front camera 121D that captures an image of a right front range Rd around the swing body 120. Incidentally, the imaging ranges of the plurality of cameras 121 may partially overlap each other.

The imaging ranges of the plurality of cameras 121 cover an entire periphery of the work machine 100 excluding a left front range Re that is visually recognized from the cab 140. Incidentally, the cameras 121 according to the first embodiment capture images of regions on left rear, rear, right rear, and right front sides of the swing body 120, but are not limited thereto in another embodiment. For example, the number of the cameras 121 and the imaging ranges according to another embodiment may differ from the example shown in FIGS. 1 and 2.

Incidentally, as shown by the left rear range Ra in FIG. 2, the left rear camera 121A captures an image of a range of a left side region and a left rear region of the swing body 120, but may capture an image of one region thereof. Similarly, as shown by the right rear range Rc in FIG. 2, the right rear camera 121C captures an image of a range of a right side region and a right rear region of the swing body 120, but may capture an image of one region thereof. Similarly, as shown by the right front range Rd in FIG. 2, the right front camera 121D captures an image of a range of a right front region and the right side region of the swing body 120, but may capture an image of one region thereof.

Configuration of Work Equipment

The work equipment 130 includes a boom 131, an arm 132, a bucket 133, a boom cylinder 134, an arm cylinder 135, and a bucket cylinder 136.

A proximal end portion of the boom 131 is attached to the swing body 120 via a boom pin P1.

The arm 132 connects the boom 131 and the bucket 133. A proximal end portion of the arm 132 is attached to a distal end portion of the boom 131 via an arm pin P2.

The bucket 133 includes blades that excavate earth or the like, and an accommodating portion that accommodates the excavated earth. A proximal end portion of the bucket 133 is attached to a distal end portion of the arm 132 via a bucket pin P3.

The boom cylinder 134 is a hydraulic cylinder that operates the boom 131. A proximal end portion of the boom cylinder 134 is attached to the swing body 120. A distal end portion of the boom cylinder 134 is attached to the boom 131.

The arm cylinder 135 is a hydraulic cylinder that drives the arm 132. A proximal end portion of the arm cylinder 135 is attached to the boom 131. A distal end portion of the arm cylinder 135 is attached to the arm 132.

The bucket cylinder 136 is a hydraulic cylinder that drives the bucket 133. A proximal end portion of the bucket cylinder 136 is attached to the arm 132. A distal end portion of the bucket cylinder 136 is attached to a link member connected to the bucket 133.

Configuration of Cab

Figure 3:
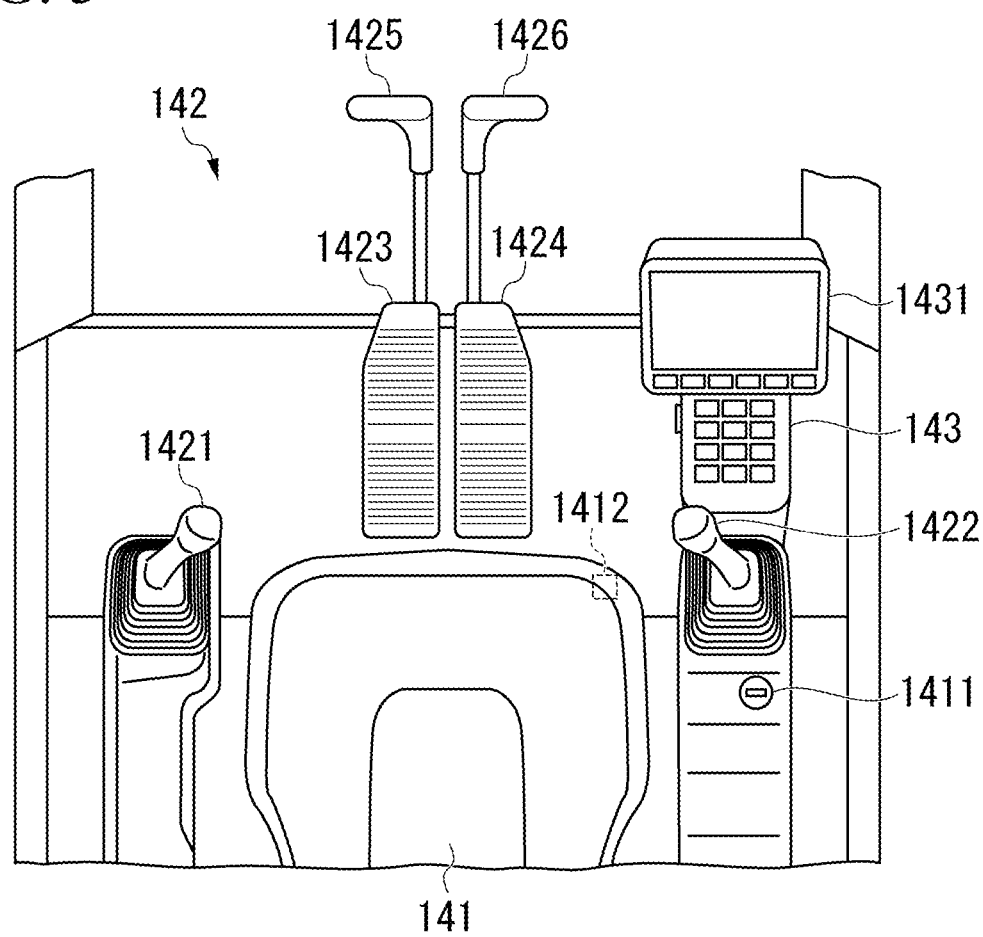
FIG. 3 is a view showing an internal configuration of a cab according to the first embodiment.

FIG. 3 is a view showing an internal configuration of the cab according to the first embodiment.

An operator's seat 141, an engine key cylinder 1411 (primary switch), a secondary switch 1412, an operation device 142, and a control device 143 are provided inside the cab 140.

The engine key cylinder 1411 receives an insertion of an engine key, and when the inserted engine key is rotated in a first direction, an engine (not shown) is driven. In addition, during driving of the engine, when the engine key inserted into the engine key cylinder 1411 is rotated in a second direction opposite to the first direction, the engine stops.

The secondary switch 1412 is provided in a lower portion of the operator's seat 141. The secondary switch 1412 is a switch that stops the engine in an emergency. When the secondary switch 1412 is pressed during driving of the engine, the engine stops.

The operation device 142 is an interface through which the undercarriage 110, the swing body 120, and the work equipment 130 are driven by a manual operation of the operator. The operation device 142 includes a left operation lever 1421, a right operation lever 1422, a left foot pedal 1423, a right foot pedal 1424, a left traveling lever 1425, and a right traveling lever 1426.

The left operation lever 1421 is provided on a left side of the operator's seat 141. The right operation lever 1422 is provided on a right side of the operator's seat 141.

The left operation lever 1421 is an operation mechanism that causes the swing body 120 to perform a swing operation and causes the arm 132 to perform a pulling or pushing operation. Specifically, when the operator of the work machine 100 tilts the left operation lever 1421 forward, the arm 132 is pushed. In addition, when the operator of the work machine 100 tilts the left operation lever 1421 backward, the arm 132 is pulled. In addition, when the operator of the work machine 100 tilts the left operation lever 1421 in a right direction, the swing body 120 swings rightward. In addition, when the operator of the work machine 100 tilts the left operation lever 1421 in a left direction, the swing body 120 swings leftward. Incidentally, in another embodiment, when the left operation lever 1421 is tilted in a front to back direction, the swing body 120 may swing rightward or leftward, and when the left operation lever 1421 is tilted in a right to left direction, the arm 132 may perform a pulling operation or a pushing operation.

The right operation lever 1422 is an operation mechanism that causes the bucket 133 to perform an excavating or dumping operation and causes the boom 131 to perform a raising or lowering operation. Specifically, when the operator of the work machine 100 tilts the right operation lever 1422 forward, a lowering operation of the boom 131 is executed. In addition, when the operator of the work machine 100 tilts the right operation lever 1422 backward, a raising operation of the boom 131 is executed. In addition, when the operator of the work machine 100 tilts the right operation lever 1422 in the right direction, a dumping operation of the bucket 133 is performed. In addition, when the operator of the work machine 100 tilts the right operation lever 1422 in the left direction, an excavating operation of the bucket 133 is performed. Incidentally, in another embodiment, when the right operation lever 1422 is tilted in the front to back direction, the bucket 133 may perform a dumping operation or an excavating operation, and when the right operation lever 1422 is tilted in the right to left direction, the boom 131 may perform a raising operation or a lowering operation.

The left foot pedal 1423 is disposed on a left side of a floor surface in front of the operator's seat 141. The right foot pedal 1424 is disposed on a right side of the floor surface in front of the operator's seat 141. The left traveling lever 1425 is pivotally supported by the left foot pedal 1423, and is configured such that the inclination of the left traveling lever 1425 and the pressing down of the left foot pedal 1423 are linked to each other. The right traveling lever 1426 is pivotally supported by the right foot pedal 1424, and is configured such that the inclination of the right traveling lever 1426 and the pressing down of the right foot pedal 1424 are linked to each other.

The left foot pedal 1423 and the left traveling lever 1425 correspond to rotational drive of a left crawler belt of the undercarriage 110. Specifically, when the operator of the work machine 100 tilts the left foot pedal 1423 or the left traveling lever 1425 forward, the left crawler belt rotates in a forward movement direction. In addition, when the operator of the work machine 100 tilts the left foot pedal 1423 or the left traveling lever 1425 backward, the left crawler belt rotates in a backward movement direction.

The right foot pedal 1424 and the right traveling lever 1426 correspond to rotational drive of a right crawler belt of the undercarriage 110. Specifically, when the operator of the work machine 100 tilts the right foot pedal 1424 or the right traveling lever 1426 forward, the right crawler belt rotates in the forward movement direction. In addition, when the operator of the work machine 100 tilts the right foot pedal 1424 or the right traveling lever 1426 backward, the right crawler belt rotates in the backward movement direction.

The control device 143 is an input and output device, and includes a display 1431 that displays information related to a plurality of functions of the work machine 100. The control device 143 is one example of a display system. In addition, the display 1431 is one example of a display unit. Input means of the control device 143 according to the first embodiment is a hard key. Incidentally, in another embodiment, a touch panel, a mouse, a keyboard, or the like may be used as the input means. In addition, the control device 143 according to the first embodiment is provided integrally with the display 1431, but in another embodiment, the display 1431 may be provided separately from the control device 143.

Configuration of Control Device

Figure 4:
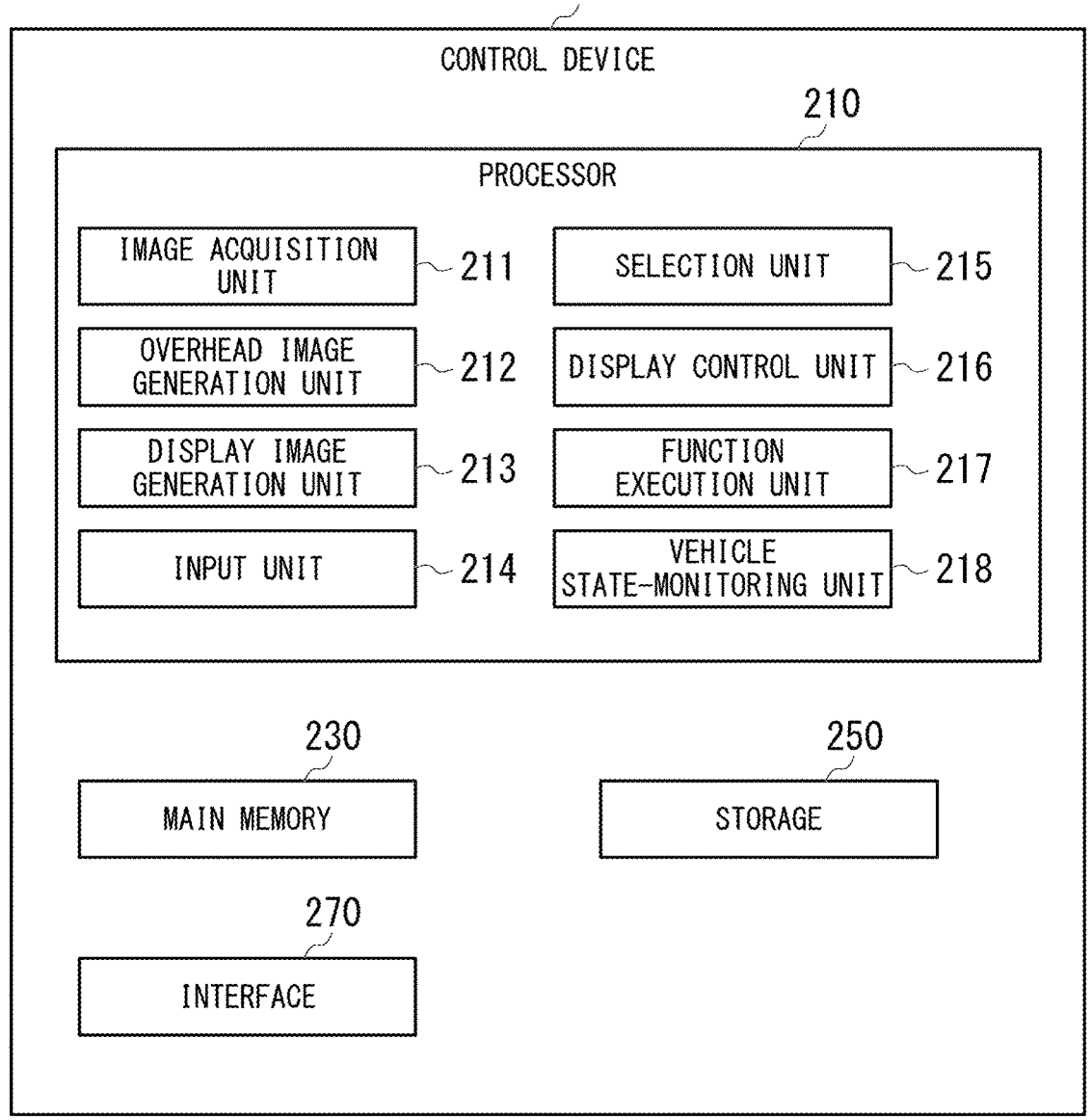
FIG. 4 is a schematic block diagram showing a configuration of a computer according to at least one embodiment.

FIG. 4 is a schematic block diagram showing a configuration of a computer according to at least one embodiment.

The control device 143 is a computer including a processor 210, a main memory 230, a storage 250, and an interface 270.

The display 1431 is connected to the processor 210 via the interface 270.

The storage 250 is a non-transitory storage medium. Exemplary examples of the storage 250 include a hard disk drive (HDD), a solid-state drive (SSD), a magnetic disk, a magneto-optical disk, a compact disc read-only memory (CD-ROM), a digital versatile disc read-only memory (DVD-ROM), a semiconductor memory, and the like. The storage 250 may be an internal medium that is directly connected to a bus of the control device 143 or may be an external medium connected to the control device 143 via the interface 270 or a communication line. The storage 250 stores a program for realizing the monitoring of the surroundings of the work machine 100. In addition, a plurality of images including icons, a user menu image, a service menu image, and a function image to be displayed on the display are stored in the storage 250 in advance.

The program may realize some of the functions to be exhibited by the control device 143. For example, the program may exhibit functions in combination with another program that is already stored in the storage 250 or in combination with another program installed in another device. Incidentally, in another embodiment, the control device 143 may include a custom large-scale integrated circuit (LSI) such as a programmable logic device (PLD) in addition to the above configuration or instead of the above configuration. Exemplary examples of the PLD include a programmable array logic (PAL), a generic array logic (GAL), a complex programmable logic device (CPLD), and a field-programmable gate array (FPGA). In this case, some or all of the functions to be realized by the processor may be realized by the integrated circuit.

The processor 210 executes the program to function as an image acquisition unit 211, an overhead image generation unit 212, a display image generation unit 213, an input unit 214, a selection unit 215, a display control unit 216, a function execution unit 217, and a vehicle state-monitoring unit 218. In addition, the processor 210 may execute the program to read the plurality of images, which are stored in the storage 250, into the main memory 230.

The image acquisition unit 211 acquires captured images from the plurality of cameras 121.

The overhead image generation unit 212 transforms and combines a plurality of the captured images to generate an overhead image in which the work machine 100 is centered when a site is viewed from above, the captured images being acquired by the image acquisition unit 211. The overhead image generation unit 212 may cut out a part of each of the transformed captured images and combine the cutout captured images to generate an overhead image. An image of the work machine 100 viewed from above is affixed to the center of the overhead image in advance, the overhead image being generated by the overhead image generation unit 212. The overhead image is one example of a peripheral image in which the surroundings of the work machine 100 are portrayed.

The display image generation unit 213 generates a display image representing information for realizing each function of the plurality of functions of the work machine 100. Exemplary examples of the functions of the work machine 100 include a user menu display function, a function of displaying vehicle information such as remaining fuel amount or coolant temperature, a function of adjusting a power mode of the work machine 100, and the like.

A display image related to each function to be generated by the display image generation unit 213 includes the overhead image generated by the overhead image generation unit 212 and a function image for realizing the function.

The input unit 214 receives an input signal to be generated by the pressing of the hard key by a user.

The selection unit 215 identifies a function of the plurality of functions of the work machine 100 which is selected by the user, based on the input signal received by the input unit 214. Namely, the selection unit 215 receives a selection of any one of the plurality of functions of the work machine 100. In addition, the selection unit 215 is one example of a transition reception unit that receives a transition signal for causing a transition of screens to be displayed on the display 1431 of the work machine 100.

The display control unit 216 generates a display signal for displaying a display image related to the function identified by the selection unit 215, among the display images generated by the display image generation unit 213, and outputs the display signal to the display 1431.

The function execution unit 217 executes the function identified by the selection unit 215.

The vehicle state-monitoring unit 218 monitors vehicle states including an operating state of the engine. For example, when the engine is stopped by pressing of the secondary switch 1412, the vehicle state-monitoring unit 218 detects stoppage of the engine.

Operation of Control Device

Figure 5:
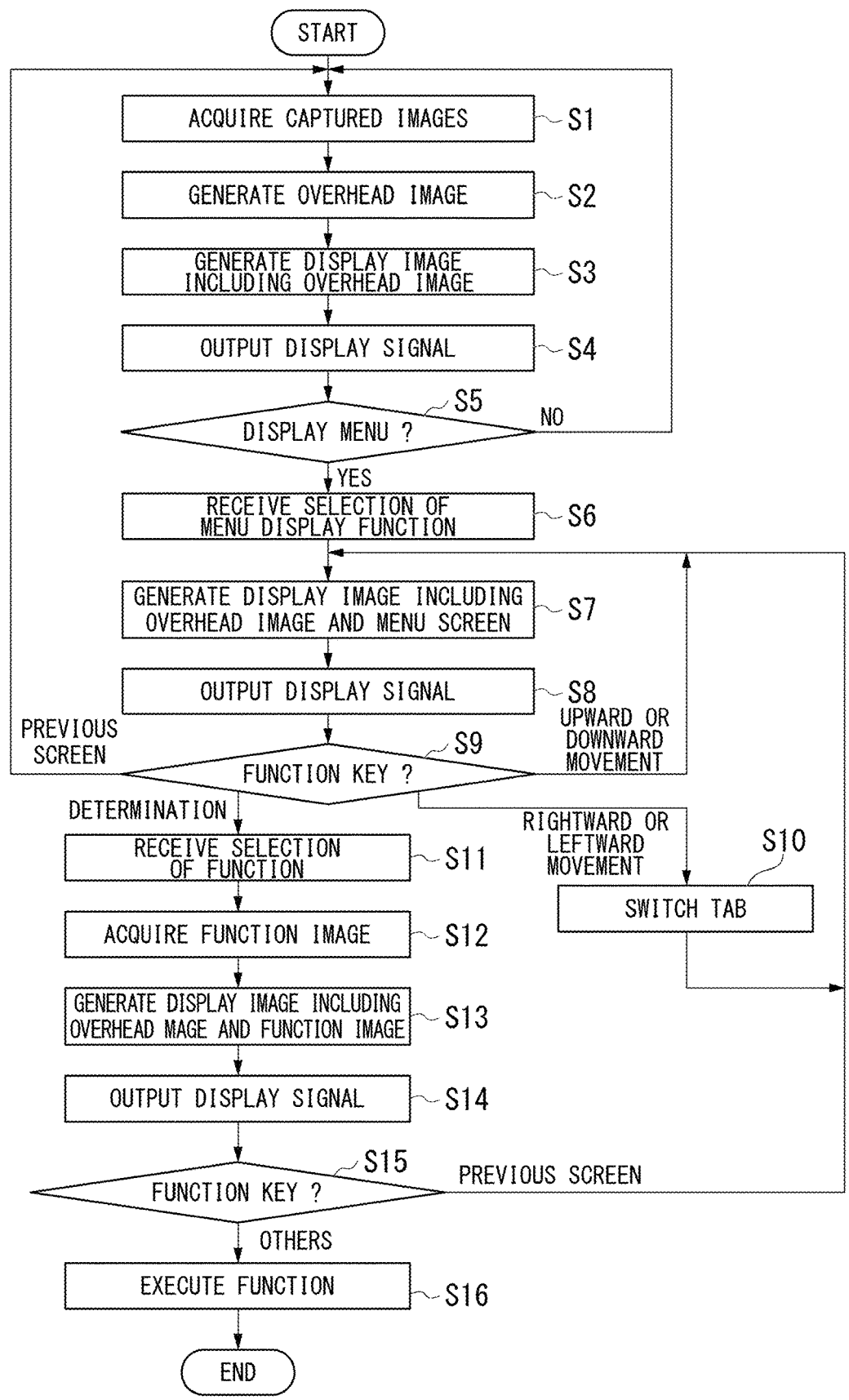
FIG. 5 is a flowchart showing a display control process of a control device according to the first embodiment.
Figure 6:
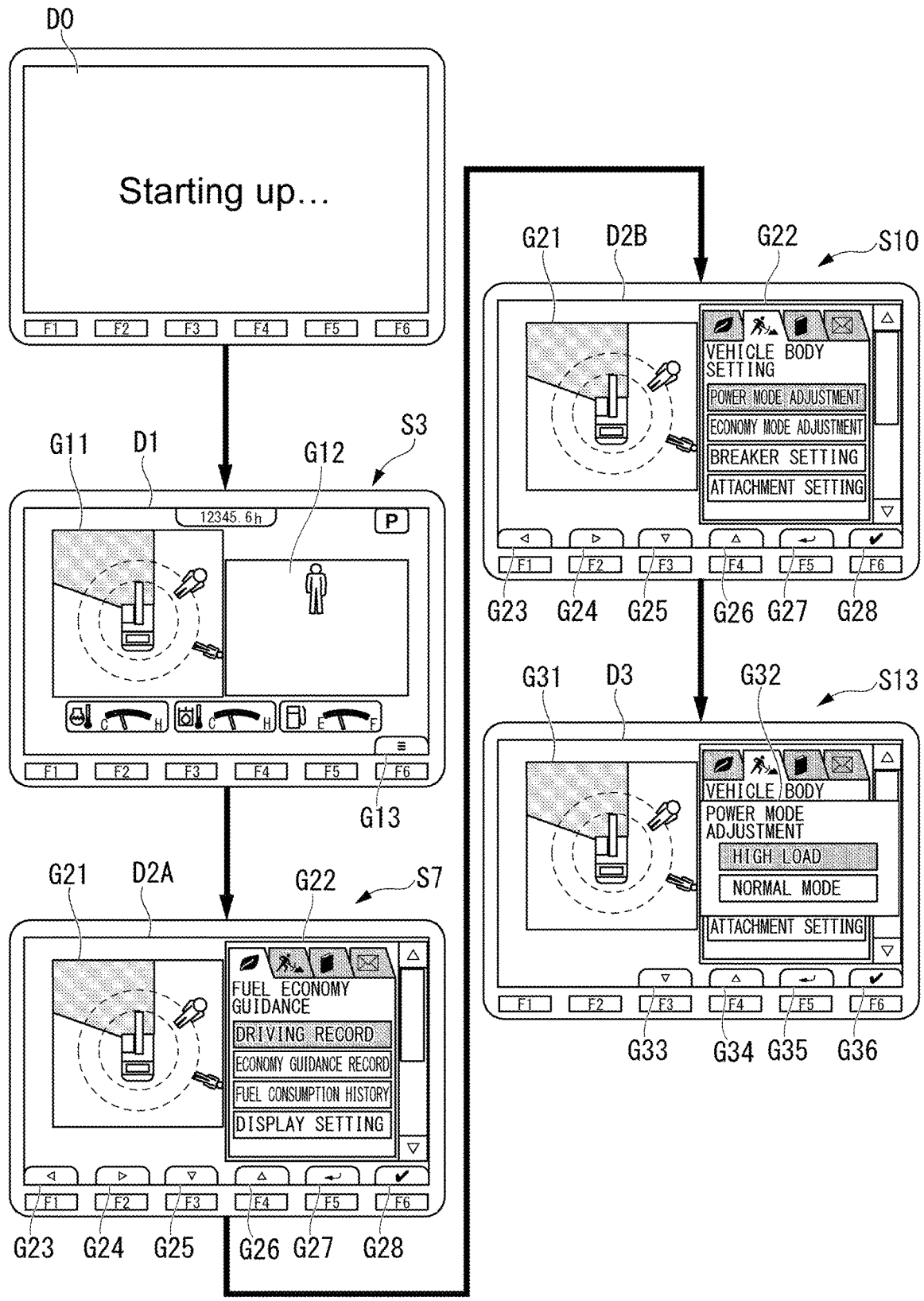
FIG. 6 is a screen transition diagram showing a transition of screens to be displayed on a display according to the first embodiment.

FIG. 5 is a flowchart showing a display control process of the control device according to the first embodiment. FIG. 6 is a screen transition diagram showing a transition of screens to be displayed on the display according to the first embodiment.

When the engine key is inserted into the engine key cylinder 1411 and rotates in the first direction, the engine is driven and the control device 143 starts up. When the control device 143 starts up, as shown in FIG. 6, the display 1431 displays a display image D0 indicating that the work machine 100 is in the process of start-up. During display of the display image D0, the start-up of the control device 143 cannot be completed, and an overhead image cannot be generated. For this reason, the display image D0 does not include an overhead image. Incidentally, the work machine 100 is in a non-operating state until the start-up of the control device 143 is completed.

When the start-up of the control device 143 is completed, the display control process shown in FIG. 5 is executed. First, the image acquisition unit 211 acquires captured images from the plurality of cameras 121 (step S1). Next, the overhead image generation unit 212 transforms and combines a plurality of the captured images acquired in step S1 to generate an overhead image (step S2). Next, the display image generation unit 213 generates a default display image D1 including one (single camera image G12) of the captured images acquired in step S1 and an overhead image G11 generated in step S2 (step S3). For example, an image captured by the right rear camera 121C is disposed in the display image D1 of FIG. 6, as the single camera image G12.

As shown in FIG. 6, the control device 143 includes six function keys F1 to F6 that are hard keys directly below the display 1431. An icon G13 is disposed in a portion corresponding to the function key F6 in a lower portion of the display image D1. The icon G13 is an icon indicating the user menu display function. Namely, the icon G13 indicates that the user menu display function is executed when the function key F6 is pressed. The icon G13 is stored in the storage 250 or the main memory 230 in advance.

The display control unit 216 outputs a display signal for displaying the display image D1 generated in step S3 to the display 1431 (step S4). Accordingly, when the start-up of the control device 143 is completed, and the work machine 100 is in an operating state, the display 1431 displays a display image including an overhead image.

Next, when the input unit 214 detects whether or not a function key is pressed by a user, the selection unit 215 determines whether or not the pressed function key is the function key F6 indicating the user menu display function (step S5). When the function key F6 is not pressed (step S5: NO), the control device 143 causes the process to return to step S1, and continues to generate and display the display image D1. On the other hand, when the function key F6 is pressed (step S5: YES), the selection unit 215 receives a selection of the user menu display function (step S6). Namely, the selection unit 215 receives a signal to be generated by pressing of the function key F6, as a signal for a transition to a user menu display screen.

Next, the display image generation unit 213 generates a display image D2 (a display image D2A or a display image D2B) including an overhead image G21 generated in step S3 and a user menu image G22 stored in advance (step S7). The user menu image G22 is a function image for realizing the user menu display function. The user menu image G22 includes a list of the plurality of functions of the work machine 100, with the focus on one of the plurality of items in the list. The item focused on is set to a color different from those of other items. The user menu image G22 displays a plurality of tabs indicating the types of lists. Namely, as shown in the display image D2A and the display image D2B, a different list is displayed in the user menu image G22 depending on a focused tab. In addition, icons G23 to G28 are disposed in portions corresponding to the function keys F1 to F6 in a lower portion of the display image D2. The icons G23 to G28 are stored in the storage 250 or the main memory 230 in advance.

The icon G23 is an icon indicating a leftward movement. Namely, the icon G23 indicates that a focus of a user menu tab moves leftward when the function key F1 is pressed.

The icon G24 is an icon indicating a rightward movement. Namely, the icon G24 indicates that a focus of a user menu tab moves rightward when the function key F2 is pressed.

The icon G25 is an icon indicating a downward movement. Namely, the icon G25 indicates that a focus of a user menu moves downward when the function key F3 is pressed.

The icon G26 is an icon indicating an upward movement. Namely, the icon G26 indicates that a focus of a user menu moves upward when the function key F4 is pressed.

The icon G27 is an icon indicating a transition to a previous screen. Namely, the icon G27 indicates that the user menu display function is canceled and a previous screen is displayed when the function key F5 is pressed.

The icon G28 is an icon indicating a determination. Namely, the icon G28 indicates that a focused function in a user menu is selected and a display screen related to the function is displayed when the function key F6 is pressed.

The display control unit 216 outputs a display signal for displaying the display image D2 generated in step S7 to the display 1431 (step S8). The display 1431 displays the display image D2 including an overhead image. Incidentally, at this time, the work machine 100 is in an operating state.

Next, when the input unit 214 detects whether or not a function key is pressed by a user, the selection unit 215 determines whether the pressed function key is the function key F2 or F1 indicating a rightward or leftward movement, the function key F4 or F3 indicating an upward or downward movement, the function key F5 indicating a transition to a previous screen, or the function key F6 indicating a determination (step S9).

When the function key F4 or F3 indicating an upward or downward movement is pressed (step S9: upward or downward movement), the display control unit 216 changes the focused item based on the pressed function key, and causes the process to return to step S7 to update the display image D2.

When the function key F2 or F1 indicating a rightward or leftward movement is pressed (step S9: rightward or leftward movement), the display image generation unit 213 acquires the user menu image G22 after the switching of the tab from the storage 250 or the main memory 230 based on the pressed function key (step S10). Then, the control device 143 causes the process to return to step S7 to update the display image D2. For example, if the function key F2 is pressed when the display image D2A shown in FIG. 6 is displayed, the display image generation unit 213 generates the display image D2B.

When the function key F5 is pressed (step S9: previous screen), the control device 143 causes the process to return to step S1, and causes the display 1431 to display the display image D1.

When the function key F6 is pressed (step S9: determination), the selection unit 215 receives a selection of a function related to a focused item among the plurality of functions (step S11). Namely, the selection unit 215 receives a signal to be generated by pressing of the function key F6, as a signal for a transition to a display screen of a function image.

Next, the function execution unit 217 acquires a function image G32 for realizing the function selected in step S11 from the storage 250 or the main memory 230 (step S12). For example, when the selected function is a function of adjusting a power mode of the work machine 100, the function execution unit 217 acquires a function image for adjusting the power mode. In addition, for example, when the selected function is an attachment-setting function of the work machine 100, the function execution unit 217 acquires a function image for setting a flow rate of oil used for an attachment provided in the work machine 100. Accordingly, power of the attachment can be changed.

Next, the display image generation unit 213 generates a display image D3 including an overhead image G31 generated in step S2 and the function image G32 acquired in step S12 (step S13). In the example shown in FIG. 6, icons G33 to G36 are disposed in portions corresponding to the function keys F1 to F6 in a lower portion of the display image D3. The icons G33 to G36 are stored in the storage 250 or the main memory 230 in advance.

The icon G33 is an icon indicating a downward movement. The icon G34 is an icon indicating an upward movement. The icon G35 is an icon indicating a transition to a previous screen. The icon G36 is an icon indicating a determination. Incidentally, the types and the number of icons to be disposed in the display image D3 may differ depending on a selected function. On the other hand, at least an icon indicating a transition to a previous screen is disposed in the display image D3.

The display control unit 216 outputs a display signal for displaying the display image D3 generated in step S14 to the display 1431 (step S14). The display 1431 displays the display image D3 including an overhead image. Incidentally, at this time, the work machine 100 is in an operating state.

Next, when the input unit 214 detects whether or not a function key is pressed by a user, the selection unit 215 determines whether the function key is the function key F5 indicating a transition to a previous screen or any one of the other function keys F1 to F4 and F6 (step S15).

When any one of the function keys F1 to F4 and F6 is pressed (step S15: others), the function execution unit 217 executes the function selected in step S11 based on the pressed function key (step S16), and ends the process. Thereafter, the control device 143 executes the display control process shown in FIG. 5 again, and causes the display 1431 to display the display image D1.

On the other hand, when the function key F5 is pressed (step S15: previous screen), the process returns to step S7, and the display 1431 displays the display image D2 that is a previous screen. Namely, when the previous screen is the display image D2A, the display image D2A is displayed again, and when the previous screen is the display image D2B, the display image D2B is displayed again.

Incidentally, the flowchart shown in FIG. 5 is one example, and in another embodiment, all the steps may not be necessarily executed. For example, in another embodiment, when a function can be selected by a shortcut button or the like without going through the display image D2, the control device 143 may not execute steps S6 to S10. In addition, when the display itself of the display image D3 corresponds to the execution of a function, the control device 143 may not execute step S16.

Incidentally, when the vehicle state-monitoring unit 218 of the control device 143 detects stoppage of the engine caused by pressing of the secondary switch 1412, the display control unit 216 outputs a display signal for displaying a stop display screen to the display 1431 because of an interrupt process, the stop display screen prompting a turn-off of the engine key. The display signal does not include an overhead image. Incidentally, during stoppage of the engine caused by pressing of the secondary switch 1412, the work machine 100 is in a non-operating state.

Effects

As described above, when the control device 143 according to the first embodiment receives a transition signal while an overhead image is displayed on the display 1431, the control device 143 also causes a screen after transition to display a display image including an overhead image. Accordingly, even when a screen transition is made by an operation of an operator, the control device 143 enables the display 1431 to display always an overhead image. Accordingly, the control device 143 enables an operator to recognize visually a situation around the work machine.

In addition, the control device 143 according to the first embodiment causes a display image to include a peripheral image as shown in FIG. 6, the display image being displayed on the display 1431 according to a display signal from when the work machine 100 is in an operating state to when the work machine 100 is in a non-operating state. Accordingly, an overhead image can always be displayed on the display 1431 while an operator can operate at least a part of the work machine 100.

In addition, when the secondary switch 1412 is pressed to bring the work machine 100 into a non-operating state, the control device 143 according to the first embodiment generates a display signal for displaying a display image that does not include an overhead image. Accordingly, the control device 143 is capable of presenting to an operator whether or not the work machine 100 can be operated, using the presence or absence of an overhead image. Namely, an operator can intuitively recognize whether or not the work machine 100 can be operated, based on the presence or absence of an overhead image.

In addition, in the first embodiment, the plurality of functions of the work machine 100 include the user menu display function, and the display image D2 includes an overhead image. Accordingly, the control device 143 enables the display 1431 to display an overhead image even when the display image D2 is displayed.

In addition, in the first embodiment, all of the overhead image G11, the overhead image G21, and the overhead image G31 are displayed at the same position. Therefore, since the overhead images have a constant display position regardless of screen transition, an operator can check the surroundings of the work machine 100 without generating a feeling of strangeness before and after screen transition.

In addition, in the first embodiment, a service meter that displays an engine coolant temperature, a remaining fuel amount, and an engine operating time displayed in the display image D1 is not displayed in a display image including the user menu image G22 or the function image G32. As described above, since only information required by an operator is display after screen transition, display can be prevented from becoming complicated.

Second Embodiment

The control device 143 according to the first embodiment causes a display image to include an overhead image during operation of the work machine 100. In contrast, the control device 143 according to a second embodiment causes a display image to include a single camera image during operation of the work machine 100. The single camera image is one example of a peripheral image in which the surroundings of the work machine 100 are portrayed.

The control device 143 according to the second embodiment may not include the overhead image generation unit 212.

Figure 7:
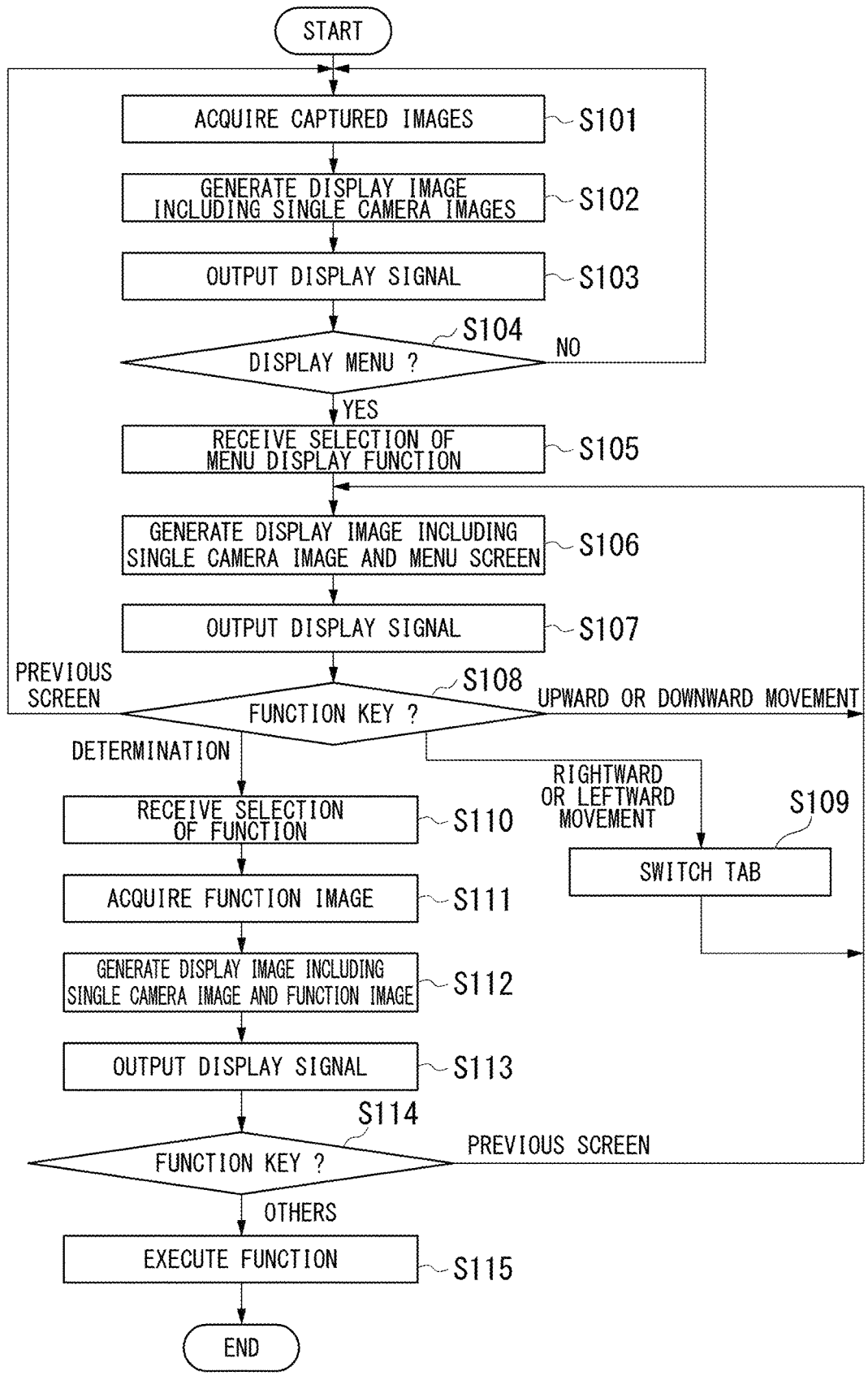
FIG. 7 is a flowchart showing a display control process of a control device according to a second embodiment.
Figure 8:
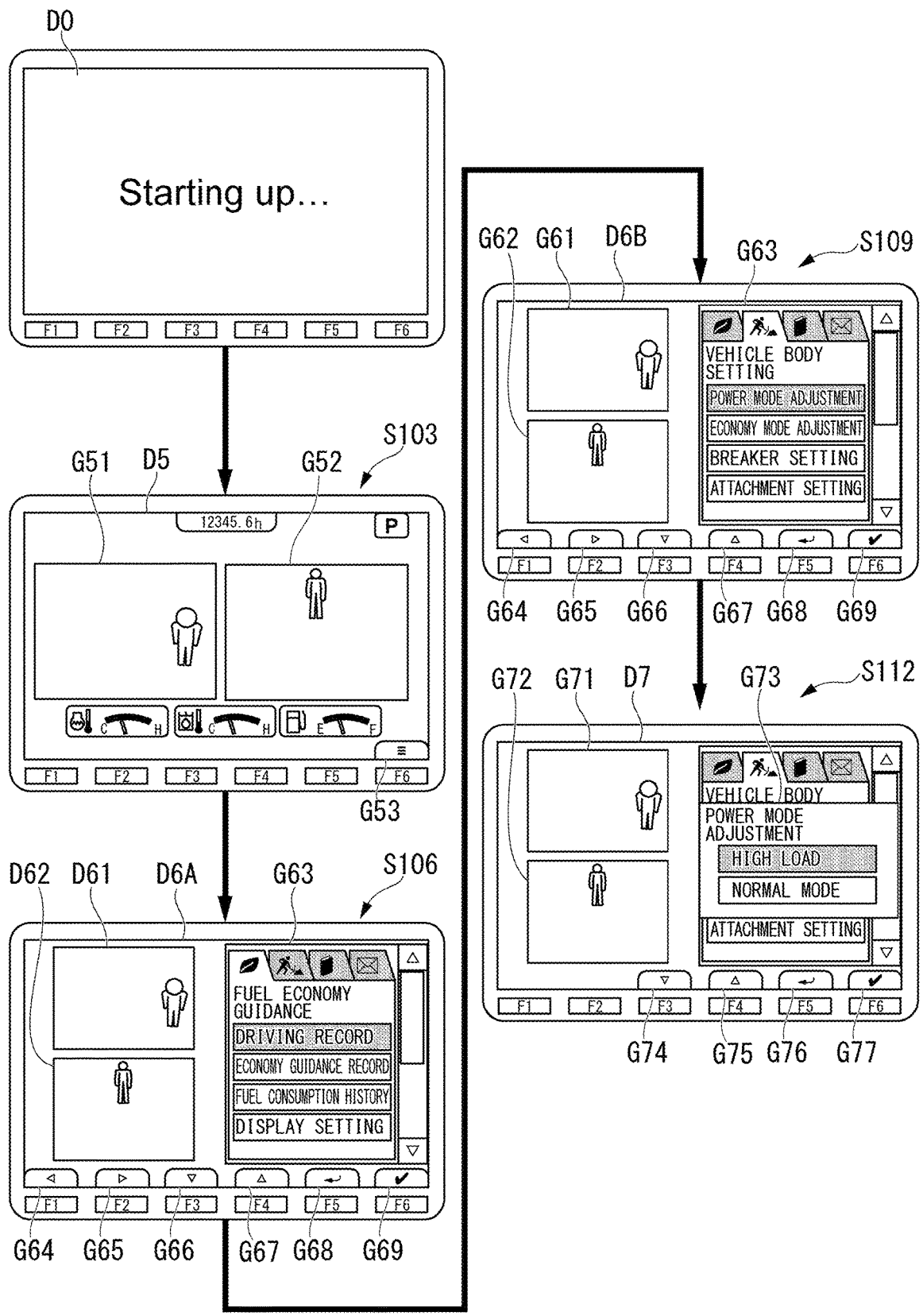
FIG. 8 is a screen transition diagram showing a transition of screens to be displayed on a display according to the second embodiment.

FIG. 7 is a flowchart showing a display control process of the control device according to the second embodiment. FIG. 8 is a screen transition diagram showing a transition of screens to be displayed on the display according to the second embodiment.

When the engine key is inserted into the engine key cylinder 1411 and rotates in the first direction, the engine is driven and the control device 143 starts up. When the control device 143 starts up, as shown in FIG. 6, the display 1431 displays the display image D0 indicating that the work machine 100 is in the process of start-up.

When the start-up of the control device 143 is completed, the display control process shown in FIG. 7 is executed. First, the image acquisition unit 211 acquires captured images from the plurality of cameras 121 (step S101). Next, the display image generation unit 213 generates a default display image D5 including two (single camera images G51 and G52) of the captured images acquired in step S101 (step S102). For example, in the display image D5 of FIG. 8, an image captured by right front camera 121D is disposed as the single camera image G51, and an image captured by the right rear camera 121C is disposed as the single camera image G52. An icon G53 is disposed in a portion corresponding to the function key F6 in a lower portion of the display image D5. The icon G53 is an icon indicating the user menu display function. The icon G53 is stored in the storage 250 or the main memory 230 in advance.

The display control unit 216 outputs a display signal for displaying the display image D5 generated in step S102 to the display 1431 (step S103). Accordingly, when the start-up of the control device 143 is completed, and the work machine 100 is in an operating state, the display 1431 displays a display image including a single camera image.

Next, when the input unit 214 detects whether or not a function key is pressed by a user, the selection unit 215 determines whether or not the pressed function key is the function key F6 indicating the user menu display function (step S104). When the function key F6 is not pressed (step S104: NO), the control device 143 causes the process to return to step S101, and continues to generate and display the display image D5. On the other hand, when the function key F6 is pressed (step S104: YES), the selection unit 215 receives a selection of the user menu display function (step S105). Namely, the selection unit 215 receives a signal to be generated by pressing of the function key F6, as a signal for a transition to a user menu display screen.

Next, the display image generation unit 213 generates a display image D6 (a display image D6A or a display image D6B) including a single camera image G61 or G62 acquired in step S101 and a user menu image G63 stored in advance (step S106). Icons G64 to G69 are displayed in portions corresponding to the function keys F1 to F6 in a lower portion of the display image D6. The icons G64 to G69 are stored in the storage 250 or the main memory 230 in advance.

The display control unit 216 outputs a display signal for displaying the display image D6 generated in step S106 to the display 1431 (step S107). The display 1431 displays the display image D6 including a single camera image. Incidentally, at this time, the work machine 100 is in an operating state.

Next, when the input unit 214 detects whether or not a function key is pressed by a user, the selection unit 215 determines whether the pressed function key is the function key F2 or F1 indicating a rightward or leftward movement, the function key F4 or F3 indicating an upward or downward movement, the function key F5 indicating a transition to a previous screen, or the function key F6 indicating a determination (step S108).

When the function key F4 or F3 indicating an upward or downward movement is pressed (step S108: upward or downward movement), the display control unit 216 changes a focused item based on the pressed function key, and causes the process to return to step S106 to update the display image D6.

When the function key F2 or F1 indicating a rightward or leftward movement is pressed (step S108: rightward or leftward movement), the display image generation unit 213 acquires the user menu image G63 after the switching of a tab from the storage 250 or the main memory 230 based on the pressed function key (step S109). Then, the control device 143 causes the process to return to step S106 to update the display image D6. For example, if the function key F2 is pressed when the display image D6A shown in FIG. 8 is displayed, the display image generation unit 213 generates the display image D6B.

When the function key F5 is pressed (step S108: previous screen), the control device 143 causes the process to return to step S101, and causes the display 1431 to display the display image D5.

When the function key F6 is pressed (step S108: determination), the selection unit 215 receives a selection of a function related to a focused item among the plurality of functions (step S110). Namely, the selection unit 215 receives a signal to be generated by pressing of the function key F6, as a signal for a transition to a display screen of a function image.

Next, the function execution unit 217 acquires a function image G72 for realizing the function selected in step S110 from the storage 250 or the main memory 230 (step S111). Next, the display image generation unit 213 generates a display image D7 including a single camera image G71 or G72 acquired in step S101 and a function image G73 acquired in step S111 (step S112). In the example shown in FIG. 8, icons G74 to G77 are disposed in portions corresponding to the function keys F3 to F6 in a lower portion of the display image D7.

The display control unit 216 outputs a display signal for displaying the display image D7 generated in step S112 to the display 1431 (step S113). Next, when the input unit 214 detects whether or not a function key is pressed by a user, the selection unit 215 determines whether the function key is the function key F5 indicating a transition to a previous screen or any one of the other function keys F3, F4, and F6 (step S114).

When any one of the function keys F3, F4, and F6 is pressed (step S114: others), the function execution unit 217 executes the function selected in step S110 based on the pressed function key (step S115), and ends the process. Thereafter, the control device 143 executes the display control process shown in FIG. 7 again, and causes the display 1431 to display the display image D5.

On the other hand, when the function key F5 is pressed (step S114: previous screen), the process returns to step S106, and the display 1431 displays the display image D6 that is a previous screen. Namely, when the previous screen is the display image D6A, the display image D6A is displayed again, and when the previous screen is the display image D6B, the display image D6B is displayed again.

Incidentally, the flowchart shown in FIG. 7 is one example, and in another embodiment, all the steps may not be necessarily executed. For example, in another embodiment, when a function can be selected by a shortcut button or the like without going through the display image D6, the control device 143 may not execute steps S105 to S109. In addition, when the display itself of the display image D7 corresponds to the execution of a function, the control device 143 may not execute step S115.

Other Embodiments

The embodiments have been described above in detail with reference to the drawings; however, the specific configurations are not limited to the above-described configurations, and various design changes and the like can be made. Namely, in another embodiment, the order of the above-described processes may be appropriately changed. In addition, some of the processes may be executed in parallel.

In the above-described embodiments, the work machine 100 has been described as being a hydraulic excavator; however, in another embodiment, the invention is applicable to various work machines such as dump trucks and wheel loaders. For example, the invention is applicable to a display system for dump trucks, wheel loaders, or other work machines.

In addition, in the above-described embodiments, a user menu image has been described as being displayed instead of the single camera image G12; however, in other embodiments, a user menu image may be displayed together with an overhead image and a single camera image. Namely, the overhead image generation unit 212 generates a reduced overhead image such that the reduced overhead image can be displayed together with a user menu and a single camera image. In addition, the display image generation unit 213 generates a reduced single camera image such that the reduced single camera image can be displayed together with a user menu and an overhead image. Namely, when the display control unit 216 receives a transition signal, the display control unit 216 generates a display signal for displaying a display image including a peripheral image having a changed display size on the screen after transition.

In addition, in the above-described embodiments, one control device 143 has been described as being installed in the work machine 100; however, in another embodiment, some of the configurations of the control device 143 may be disposed in other control devices, and the invention may be realized by a display system including two or more control devices. Incidentally, one control device 143 shown in the above-described embodiments is also one example of a display system.

In addition, the control device 143 according to the above-described embodiments has been described as being installed in the work machine 100; however, in another embodiment, some or all of the configurations of the control device 143 may be installed outside the work machine 100. For example, in another embodiment, the control device 143 may control the work machine 100 according to a remote operation. In this case, the control device 143 causes the above-described screens to be displayed on a display device disposed in a remote operation room.

In addition, the control device 143 according to the above-described embodiments does not include a left front camera that captures an image of the left front range Re, but may include a left front camera that captures an image of the left front range Re in another embodiment. In this case, the control device 143 is capable of generating an overhead image in which an entire periphery around the work machine 100 is portrayed.

The control device 143 according to the above-described embodiments includes the display 1431, and causes the display 1431 to display a display image, but is not limited thereto in another embodiment. For example, the control device 143 according to another embodiment may not include the display 1431, and may transmit a signal for displaying a display image on the display 1431 separate from the control device 143. Incidentally, the invention may be realized by a display system including the display 1431 separate from the control device 143, and two or more control devices each including some of the configurations of the control device 143 described above.

When the secondary switch 1412 is pressed to bring the work machine 100 into a non-operating state, the control device 143 according to the above-described embodiments generates a display signal for displaying a display image that does not include an overhead image and a single camera image; however, in another embodiment, the invention is not limited thereto. For example, even when the secondary switch 1412 is pressed to bring the work machine 100 into a non-operating state, a display signal for displaying a display image including an overhead image or a single camera image may be generated.

In the control device 143 according to the above-described embodiments, when a function for receiving an operation to be performed by an operator or the like is displayed (for example, a user menu image, a function image, or the like), a display image including an overhead image or a single camera image is displayed on the display 1431; however, in another embodiment, the invention is not limited thereto. For example, in another embodiment, when a service menu or the like is displayed for receiving an operation to be performed by a serviceman, the control device 143 may cause the display 1431 to display a display image including an overhead image or a single camera image.

Figure 9:
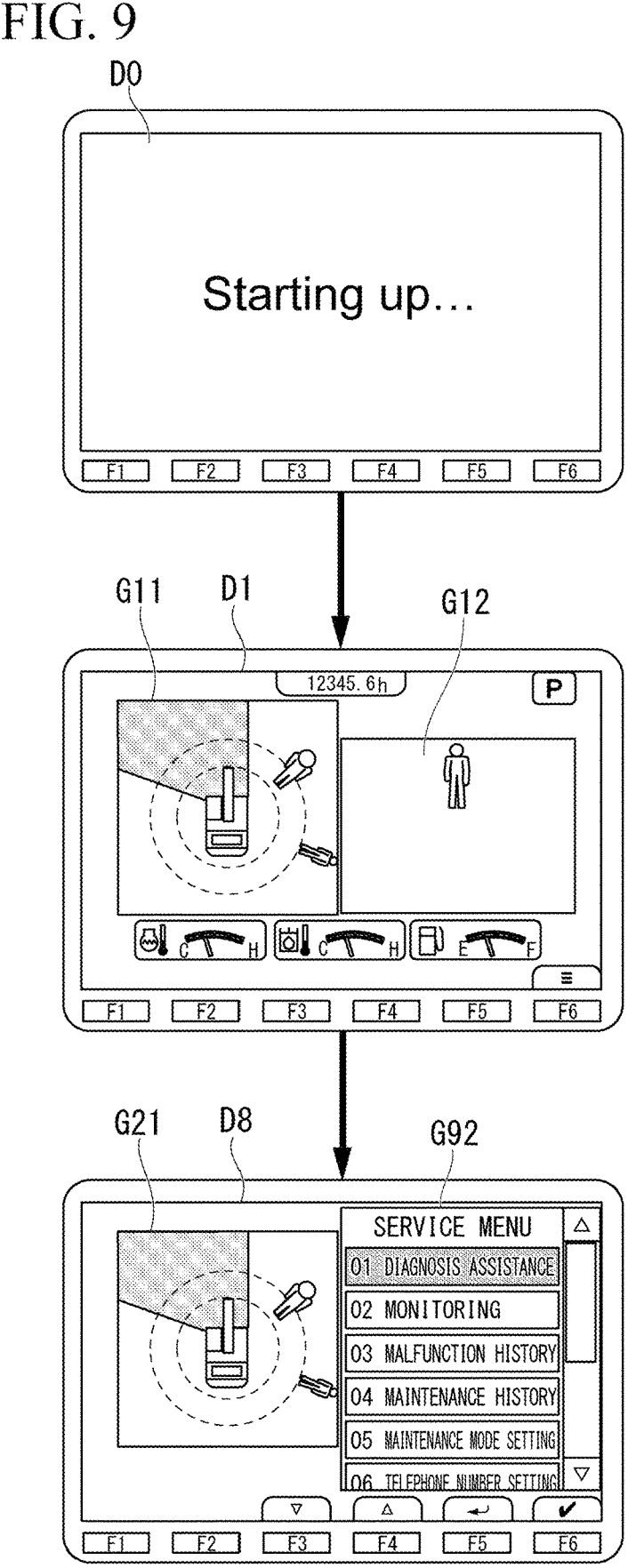
FIG. 9 is a screen transition diagram showing a transitions of screens to be displayed on a display according to another embodiment.

FIG. 9 is a screen transition diagram showing a transition of screens to be displayed on the display according to another embodiment. After a start-up of the control device 143, the default display image D1 including the overhead image G11 may be displayed, and a display image D8 including a peripheral image of the work machine 100 such as an overhead image or a single camera image, and a service menu image G92 may be displayed. When a display image is displayed after the start-up of the control device 143, for example, when the default display image D1 is displayed, the display image D8 is displayed by a predetermined operation of the display 1431. When a menu image such as the display image D2 is displayed, the menu image may be displayed by a predetermined operation of the display 1431.

As described above, since the control device 143 causes the display image D8 including a peripheral image of the work machine 100 and the service menu image G92 to be displayed, when a serviceman performs the checking or setting of various histories of the work machine 100, a situation around the work machine 100 can be checked. Therefore, the work machine 100 can be operated after the safety of the surroundings is checked.

In addition, in the above-described embodiments, the display 1431 has been described as being installed in the work machine 100; however, in another embodiment, the display 1431 may be installed outside the work machine 100. For example, the display 1431 may be provided at a point away from a work site, and the control device 143 may transmit a signal for displaying a display image on the display 1431 via a network such as the Internet.

According to the disclosure of the present invention, an operator can visually recognize a situation around a work machine.

The invention claimed is:

1. A work machine display system comprising:
   a control device including a processor;
   at least one camera arranged to capture a captured image of surroundings of a work machine; and
   a display device,
   the control device being programmed to
      acquire the captured image from the at least one camera,
      generate a peripheral image based on the captured image,
      cause the display device to display a first display image including the peripheral image, the peripheral image portraying the surroundings of the work machine, and
      generate a display signal to cause the display device to display a second display image including the peripheral image and other content in response to receiving a transition signal for screen transition while the first display image is displayed, the transition signal being generated in response to a selection operation performed by a user to display the other content,
   the other content including a menu and a position and a size of the peripheral image being constant in both the first display image and the second display image.

2. The work machine display system according to claim 1, wherein
   the control device is configured to display the peripheral image so long as the work machine is in an operating state.

3. The work machine display system according to claim 1, wherein
   the control device is configured to display a third display image that does not include the peripheral image when the work machine is in a non-operating state.

4. The work machine display system according to claim 1, wherein
   the menu is a service menu,
   the transition signal is a signal for a transition to a screen that displays the service menu, and
   the display signal causes the display device to display the second display image to include the service menu and the peripheral image.

5. The work machine display system according to claim 1, wherein
   the control device is configured to determine that the work machine is in the operating state when an engine of the work machine is running.

6. The work machine display system according to claim 1, wherein
   the control device is configured to determine that the work machine is in the operating state based on a state of an emergency stop switch configured to cause an engine of the work machine to stop.

7. The work machine display system according to claim 1, wherein
   the selection operation is an operation of a function key by the user.

8. The work machine display system according to claim 1, wherein
   the first display image is a default display image that is displayed upon completion of a startup process of the control device.

9. The work machine display system according to claim 8, wherein
   the first display image includes a single camera image displayed in a different portion of the first display image than the peripheral image, and
   the second display image does not include the single camera image.

10. The work machine display system according to claim 9, wherein
    the menu includes a plurality of tabs, each of the plurality of tabs including a list of selectable items corresponding to functions of the work machine.

11. The work machine display system according to claim 10, wherein
    at least one of the selectable items is a for adjusting a setting of a component of the work machine.

12. The work machine display system according to claim 10, wherein
    at least one of the selectable items is for displaying vehicle information.

13. The work machine display system according to claim 1, wherein
    the menu includes a plurality of tabs and each of the plurality of tabs includes a list of selectable items corresponding to functions of the work machine.

14. The work machine display system according to claim 13, wherein
    at least one of the selectable items is for adjusting a setting of the work machine.

15. The work machine display system according to claim 13, wherein
    at least one of the selectable items is for displaying vehicle information.

16. The work machine display system according to claim 1, wherein
    the menu is displayed in a different portion of the second display image than the peripheral image.

17. A work machine display method of a work machine display system, the method comprising:
    acquiring a captured image in which surroundings of a work machine are portrayed;
    generating a peripheral image based on the captured image and causing a display device to display a first display image including the peripheral image, the peripheral image portraying the surroundings of the work machine; and
    generating a display signal to cause the display device to display a second display image including the peripheral image and other content in response to receiving a transition signal for screen transition while the first display image is displayed, the transition signal being generated in response to a selection operation performed by a user to display the other content, the other content including a menu and a position and a size of the peripheral image being constant in both the first display image and the second display image.

* * * * *